United States Patent Office 3,443,097
Patented May 6, 1969

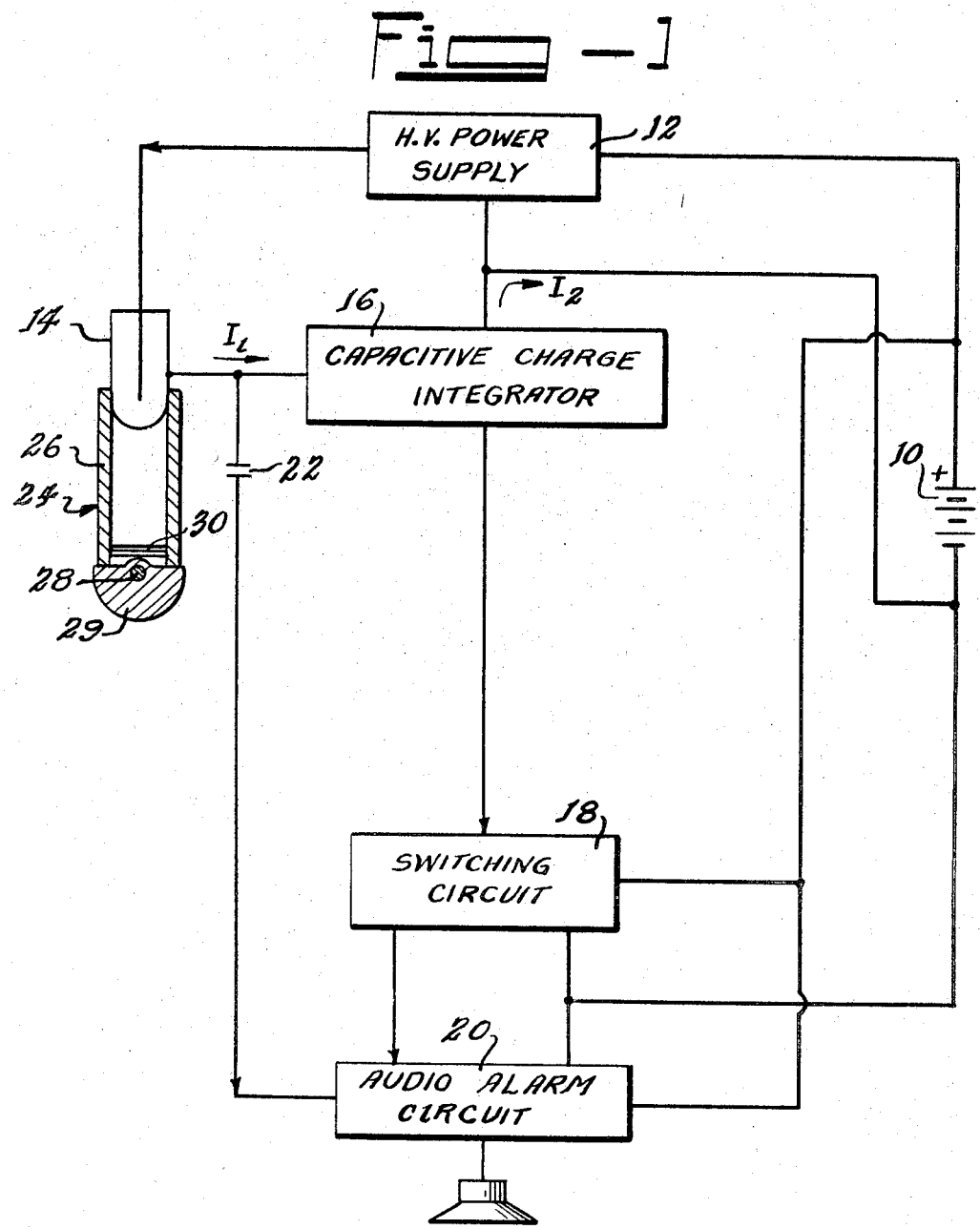

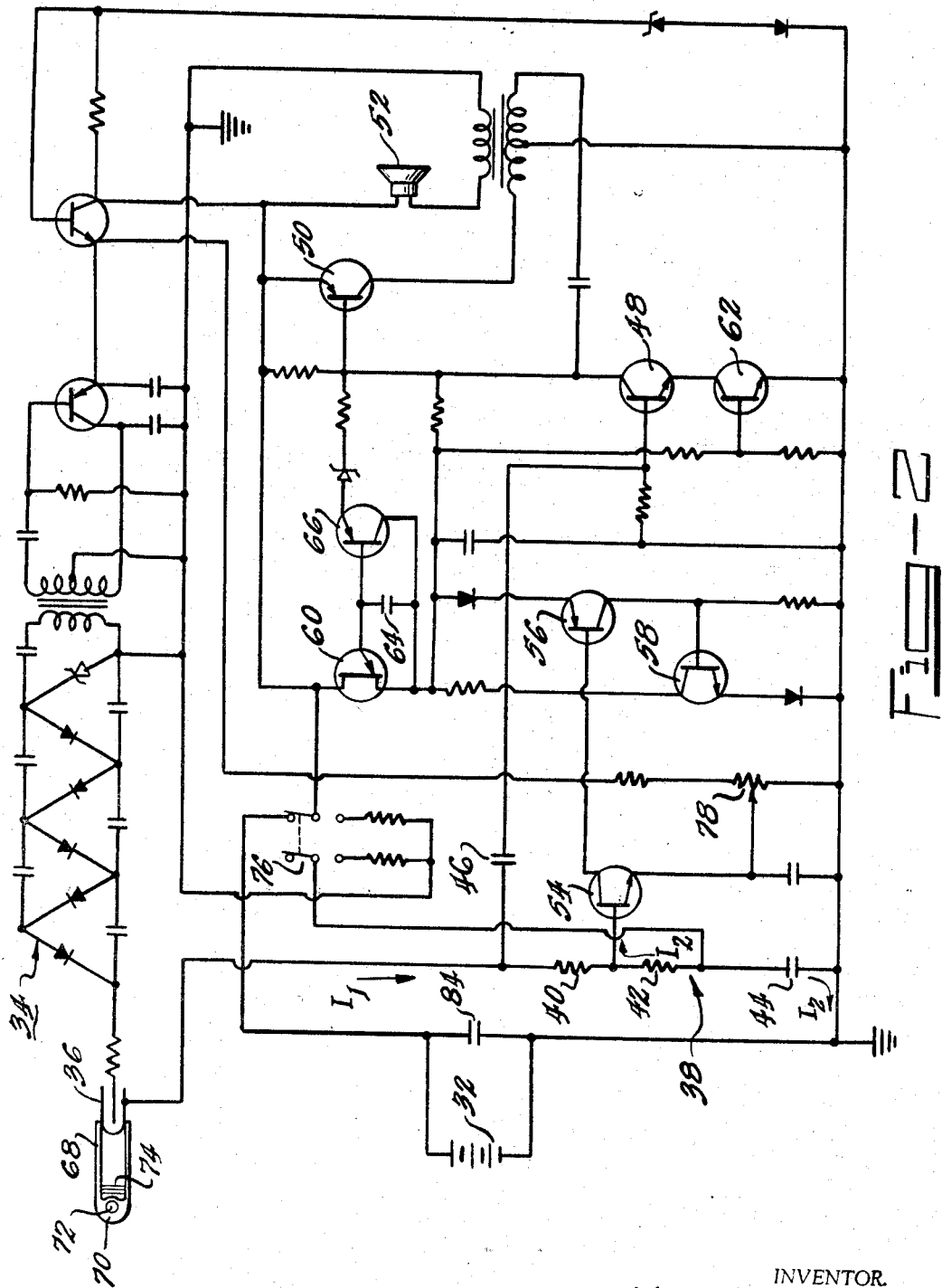

3,443,097
POCKET RADIATION DOSIMETER UTILIZING CAPACITOR INTEGRATOR
Marvin L. Smith, Kennewick, Wash., assignor to the United States of America as represented by the United States Atomic Energy Commission
Filed Jan. 5, 1968, Ser. No. 695,971
Int. Cl. G01t *1/18*
U.S. Cl. 250—83.6    5 Claims

ABSTRACT OF THE DISCLOSURE

A pocket radiation dosimeter comprises a radiation counter tube and a capacitor integrator connected to integrate the output of the counter tube. An alarm actuates responsive to a predetermined storage voltage of the capacitor integrator and a radiation source coupled to the counter tube provides therefrom a compensatory signal for electrical leakage of the capacitor integrator.

CONTRACTUAL ORIGIN OF THE INVENTION

The invention described herein was made in the course of, or under, a contract with the United States Atomic Energy Commission.

BACKGROUND OF THE INVENTION

The present invention relates to radiation detection devices and more particularly to a pocket radiation dosimeter.

Pocket dosimeters are used widely in the nuclear field to measure the radiation to which the wearer has been exposed. A need exists in the nuclear art for a pocket radiation detection device which will indicate the relative intensity of the radiation field to the wearer as well as alarm on a preset total dose of radiation to which the wearer has been exposed. The present invention fulfills this need.

SUMMARY OF THE INVENTION

In general, the present invention comprises a radiation detector with capacitive charge-integrating means coupled thereto. An alarm operates responsive to a predetermined storage voltage of the capacitive charge-integrating means. A radiation source is provided coupled to the radiation detector to provide therefrom a compensatory electrical signal for the leakage signal of the capacitor in the capacitive charge-integrating means.

BRIEF DESCRIPTION OF THE DRAWINGS

Further understanding of the present invention may be obtained from consideration of the accompanying drawings in which:

FIG. 1 is a general embodiment of an apparatus constructed according to the present invention.

FIG. 2 is a detailed schematic of the preferred embodiment of an apparatus constructed according to the present invention.

In FIG. 1, a D-C supply 10 powers a high-voltage power supply 12 which, in turn, drives a conventional radiation detector 14, such as a Geiger-Müller counter tube. The output from the radiation detector 14, a current $I_1$, is fed to a capacitive charge integrator 16. The output from capacitive charge integrator 16 is fed via a switching circuit 18 to an audio alarm circuit 20. The output from radiation detector 14, the current $I_1$, is also fed via a capacitor 22 to another input of the audio alarm circuit.

The radiation detector 14 is coupled to a radiation source 24. The radiation source 24 comprises a tubular radiation shield 26 engageable with the detector 14. A radiation-emitting material 28 is mounted within an end cap 29 of the shield 26 as shown. Sheets 30 of radiation-attenuating material are interposed between the radiation-emitting material 28 and the radiation detector 14.

In operation, the radiation detector 14 in the presence of radiation emits an output current $I_1$ which is fed to the capacitive charge integrator 16 and to the audio alarm circuit 20 via capacitor 22. The current $I_1$, passing through the capacitor 22 to the audio alarm circuit, causes an audible motorboating sound to indicate the presence of radiation at a frequency proportional to the amount of radiation detected. The current $I_1$, as stated, is also fed to the capacitive charge integrator 16 where it builds up the charge on the capacitor within the integrator 16. When the charge on the capacitor within the capacitive charge integrator 16 attains a predetermined value, the switching circuit 18 responsive thereto energizes the audio alarm circuit to give an audible alarm warning.

The capacitor within the capacitive charge integrator 16 has a leakage current $I_2$ therefrom. For the practice of the present invention, it is necessary to compensate for this leakage current $I_2$. This is accomplished using the radiation source 24. The sheets 30 are selected so that they attenuate the radiation from the radiation-emitting material 28 to provide therefrom radiation which will give an output radiation current from the radiation detector 14 which will compensate for the leakage current $I_2$ from the capacitor in the charge integrator 16. Thus, the capacitive charge integrator 16 is able to provide an integrated dose storage which will accurately reflect the accumulated radiation to which the wearer has been exposed.

Further, the radiation from the material 28 provides an in-circuit check of the operability of the device, since it furnishes a continuous radiation count with a resulting motorboat signal output therefor in the absence of external radiation.

DESCRIPTION OF THE PREFERRED EMBODIMENT

Turning to FIG. 2, a detailed schematic preferred embodiment for the practice of the present invention is shown. A battery 32 furnishes the power to a high-voltage D-C supply 34. The high-voltage D-C supply provides the high voltage for a Geiger-Müller radiation detector 36. The output from the Geiger-Müller detector 36 is connected to a capacitive charge integrator 38 comprising resistors 40 and 42 and capacitor 44. The output from the Geiger-Müller detector 36 is also fed to a capacitor 46.

The output from capacitor 46 is fed to a driver transistor 48 which, via an amplifier transistor 50, energizes the speaker 52 to generate an audible motorboating signal whose frequency is proportional to the radiation to which the wearer of the dosimeter is exposed.

The common terminal of the resistors 40 and 42 is connected to the base of a switching transistor 54. The output from transistor 54 is fed via a monostable latch transistor 56 and an amplifier transistor 58 to a unijunction transistor 60. The output from amplifier transistor 58 is also fed to driver transistor 62. The output of the unijunction transistor 60, across capacitor 64, is a square wave and drives an oscillator transistor 66. The output of oscillator 66 is fed via amplifier transistor 50 to the speaker 52 where it provides an audible alarm signal.

To the Geiger-Müller radiation detector 36 is attached a radiation shield 68. In the end cap 70 of the shield 68 is mounted a beta-radiation-emitting material 72, such as $Sr^{90}$. A plurality of sheets 74 of a radiation-attenuating material, such as tin or lead, are mounted within the radiation shield 68 interposed of the radiation-emitting material 72 and the Geiger-Müller detector 36. A switch 76 is mounted, as shown, between the battery 32, the unijunction transistor 60, the capacitive charge integrator 38 and electrical ground.

In operation, the switch 76 is placed in the position shown in FIG. 2, thereby connecting the battery 32 to the transistors in the circuit and the high-voltage supply 34. The high-voltage supply 34 supplies a high voltage (approximately 375 volts) to the inner electrode of the Geiger-Müller radiation detector 36. The output current $I_1$ from the Geiger-Müller detector 36 is fed via the capacitor 46 and transistors 48 and 50 to the speaker 52 where it produces an audible motorboating signal whose frequency is proportional to the radiation to which the dosimeter is exposed.

The output of the Geiger-Müller detector 36 is also fed to the capacitive charge integrator 38 where it charges the capacitor 44 until a predetermined charge accumulation is attained thereon. When this predetermined charge accumulation is effected, the transistor 54 is gated on to cause an output from the oscillator transistor 66 with a resulting audible alarm signal from speaker 52. The voltage level at which transistor switch 54 is actuated is determined by the setting of resistor 78. As previously explained for the apparatus of FIG. 1, the capacitor 44 is subject to a leakage current $I_2$. This leakage current is compensated for by the radiation-emitting material 72. The sheets 74 are chosen so that the radiation from material 72 as detected by the Geiger-Müller detector 36 provides a current which will replace the leakage current $I_2$ from the capacitor 44. For successful operation of the embodiment of FIG. 2, it has been found that the amount of radiation from the radiation-emitting material 72 which is detected by the Geiger-Müller detector 36 should be sufficient to provide a current equal to the leakage current $I_2$ of the capacitor 44 at a voltage of 70% of the predetermined charge accumulation thereon. Thus, if the voltage level at which the transistor switch 54 is gated on (and the alarm sound) is 2 volts, then the leakage currents $I_2$ is measured for the capacitor 44 at a voltage thereof of 1.4 volts and the attenuator plates 74 adjusted to give a compensatory current equal to this leakage current value, thereby avoiding false alarms.

By throwing the switch 76 to its opposing terminals 80 and 82, the capacitor 44 will be discharged and the dosimeter restored to its initial condition. The capacitor 84 across the battery 32 has been found desirable as a protective device when switching switch 76 to its ground position.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. A radiation-measuring device comprising radiation-detecting means producing an electrical signal responsive to said radiation, means including a capacitor for charge-integrating said electrical signal, alarm means responsive to a predetermined integrated charge on said capacitor, and radiation source means coupled to said radiation detector means to provide therefrom a compensatory electrical signal for the charge leakage of said capacitor.

2. The apparatus of claim 1 wherein said radiation source means comprise a radiation-emitting material, radiation-shielding means disposed about said radiation-emitting material and a portion of said radiation-detecting means to expose said material to said radiation-detecting means, and variable radiation-attenuating means interposed of said radiation-emitting material and said radiation-detecting means.

3. The apparatus of claim 2 wherein said variable radiation-attenuating means has a value to permit radiation from said radiation-emitting material as detected by said radiation-detecting means to provide an electrical signal therefrom equal to the charge leakage of said capacitor at a voltage of seventy percent of said predetermined integrated charge thereof.

4. A radiation-measuring device comprising a radiation counter tube, a capacitor integrator connected to integrate the output of said counter tube, an alarm responsive to a predetermined storage voltage of said capacitor integrator, and a radiation source coupled to said counter tube to provide therefrom a compensatory signal for electrical leakage of said capacitor integrator.

5. The apparatus of claim 4 wherein said radiation source comprises a material for generating beta radiation, a radiation shield about said material and said counter tube to transmit said beta radiation to said counter tube, and radiation-attenuating material interposed of said material and said counter tube to limit said compensatory signal to a value equal to the electrical leakage of said capacitor integrator at said predetermined storage voltage.

References Cited
UNITED STATES PATENTS

| | | | |
|---|---|---|---|
| 3,366,791 | 1/1968 | Markow | 250—83.6 |
| 2,531,144 | 11/1950 | Manley | 250—83.6 |
| 2,975,287 | 3/1961 | Ohmart | 250—83.6 |

RALPH G. NILSON, *Primary Examiner.*

D. L. WILLIS, *Assistant Examiner.*

U.S. Cl. X.R.

250—83.3